J. MacDOUGALL.
DIRT SCRAPER.
APPLICATION FILED JUNE 21, 1912.
1,105,283.
Patented July 28, 1914.
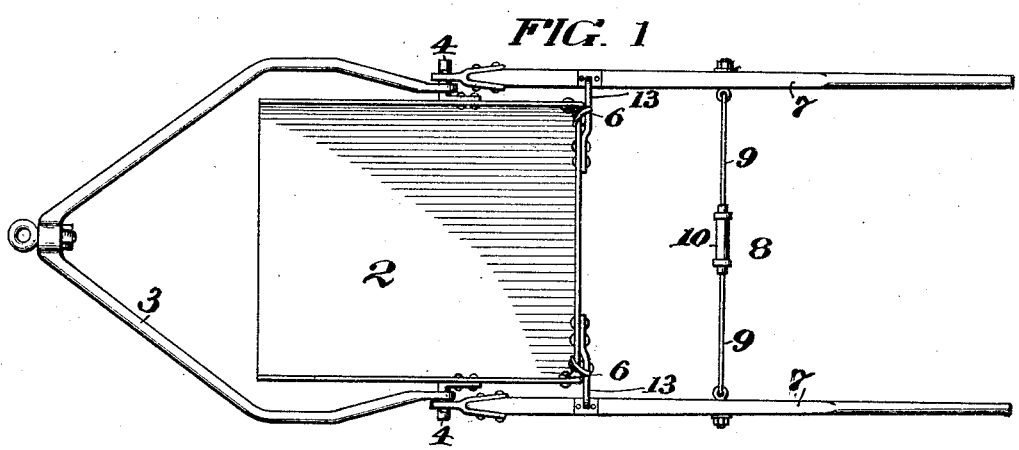
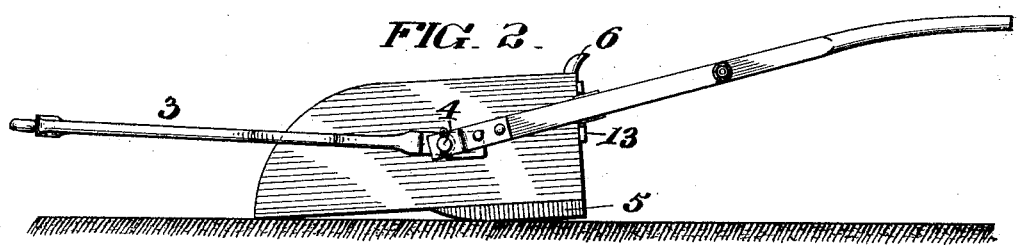
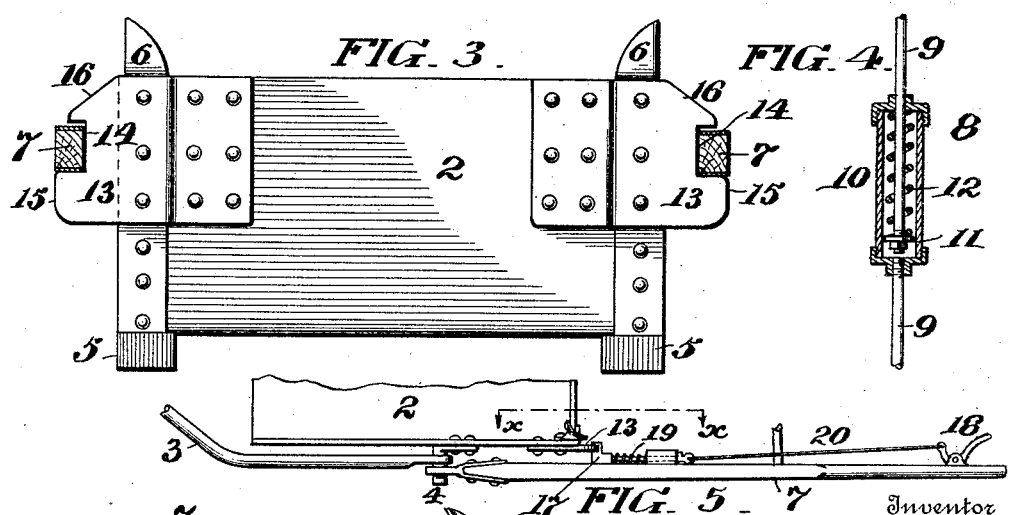
Witnesses
Daniel Webster, Jr.
E. W. Smith
Inventor
James MacDougall
By
Attorney

UNITED STATES PATENT OFFICE.

JAMES MacDOUGALL, OF PHOENIXVILLE, PENNSYLVANIA.

DIRT-SCRAPER.

1,105,283.  Specification of Letters Patent.  Patented July 28, 1914.

Application filed June 21, 1912.  Serial No. 704,988.

*To all whom it may concern:*

Be it known that I, JAMES MacDOUGALL, citizen of the United States, and resident of Phoenixville, county of Chester, and State of Pennsylvania, have invented an Improvement in Dirt-Scrapers, of which the following is a specification.

My invention has reference to dirt scrapers and consists of certain improvements which are fully set forth in the following specification and shown in the accompanying drawings which form a part thereof.

The object of my invention is to provide a dirt scraper of the class which is dragged by a horse and guided by hand and intended to have the scoop rotate upon the bail, when discharging its load, with special features of construction whereby the scoop may be allowed to rotate, not only relatively to the bail but also relatively to the handles, and to automatically reset itself after discharging its load.

My invention consists of the combination of the bail and handles with a rotatable scoop pivoted to the said bail and handles upon a transverse axis with capacity of complete revolution about said axis, and locking means for normally locking the scoop to the handles in scraping position and for releasing said scoop from said position when it is desired to permit it to rotate to dump the load; and my invention further consists of the features above specified when the scoop is provided with one or more prongs at the upper part of its rear end for engaging the ground when the scoop is inverted and thereby causing the scoop to be completely rotated or reset into its original scraping position for reëngagement with the handles.

My invention also comprehends details of construction, which together with the features above specified, will be better understood by reference to the drawings, in which:—

Figure 1 is a plan view of a dirt scraper embodying my invention; Fig. 2 is a side elevation of the same; Fig. 3 is a rear view of the scraper with the handles in section; Fig. 4 is a sectional view of the spring for drawing the handles toward each other; Fig. 5 is a plan view of one side of the scraper illustrating a modification of my invention; and Fig. 6 is a sectional elevation of a portion of the same on line x—x.

2 is the metal scoop and may be of any ordinary shape, being provided with sides and back and open at the front, and preferably having the runners or rockers 5 on the bottom for manipulating the scoop.

3 is the bail to which the horse is attached and has its rear ends hinged to the lateral pivot studs 4 which project from the side portions of the scoop. The bail is so shaped that the scoop may completely rotate about the points 4. The upper rear corners of the scoop are provided with prongs or projections 6 for taking hold upon the ground during the rotation of the scoop for causing it to continue its rotation to right itself after having dumped its load.

7 are the two handles and these are hinged at their forward ends to the pins 4 of the scoop and are drawn toward each other by the spring connection 8. The construction of this spring connection which I prefer is shown in Fig. 4, in which the rods 9, 9, extending from the handles are spring jointed together by a casing 10 secured to one rod and a washer and nut 11 on the other rod, and a coil spring 12 surrounding the last mentioned rod and interposed between the washer and nut 11 and end of the casing 10. By adjusting the washer and nut 11 the tension of the spring 12 may be varied to suit the requirements.

13 are plates secured to the rear end of the scoop and project laterally from each side of the same; and are, moreover, notched as at 14 to receive the handles 7. The upper edges of these plates are beveled as at 16 to act as cams to push the handles apart against the action of the spring 12 which causes them to snap into the recesses 14, and arrest further rotation of the scoop relatively to the handles. The lower shoulder 15 of the plates extends beyond the beveled or cam portions 16 so that when the cam portions 16 slip upwardly beyond the handles the projecting shoulders 15 will strike the handles and positively arrest further rotation of the scoop and give full opportunity for the spring 12 to pull the handles into the notches 14. When it is desired to dump the contents of the scoop, the handles are pushed apart by hand and thereby release the scoop to permit it to invert itself and dump its load, continuing its rotation, however, until it rights itself and once more engages the handles.

In the modification shown in Figs. 5 and 6, the notched plates 13 are extended rearwardly instead of sidewise and the handle structure 7 is provided with detents or latches 17 to engage the notches of the plates 13 and said latches are operated by the rods 20 and hand levers 18 in one direction to release the scoop and by springs 19 in the other direction to engage and hold the scoop against rotation on the handles. Any other means for holding or releasing the scoop relatively to the handles may be employed if so desired as I do not confine myself in this respect.

It will now be understood that the scraper may be manipulated as has heretofore been customary in taking its load and in tilting the scoop to cause its front edge to dig into the earth to invert the scoop and dump its load, but my invention permits this final operation without carrying the handles forward as is the case where they are rigidly secured to the scoop; and furthermore, with my invention the prongs 6 of the inverted scoop dig into the earth and cause it to automatically right itself after the dumping of its load and relock itself to the handles, which latter have not left the hands of the operator.

I have shown my invention in the form I prefer in practice, but I do not restrict myself to the details as these may be modified without departing from the spirit of the invention.

Having now described my invention, what I claim as new and desire to secure by Letters Patent, is:—

1. In a dirt scraper, a scoop having laterally projecting pivots at each side thereof, a bail pivotally mounted on said pivots, a pair of plates secured to the rear of said scoop and each projecting laterally therefrom, each of said plates having a recess or notch in the extended edge thereof, and also provided with a beveled portion extending from the junction of the top of said plate with the side edge of the scoop, and terminating in said notch or recess, a prong secured to each plate and projecting above the top of the scoop, a pair of handles for said scoop, each of which is movably mounted on one of said pivots and adapted to seat in one of said plate notches, and spring controlled means between said handles for normally holding said handles seated in said notches whereby said scoop and handles are movable together.

2. In a dirt scraper, a scoop having laterally projecting pivots at each side thereof, a bail pivotally mounted on said pivots, a pair of plates secured to the rear of said scoop and each projecting laterally therefrom, each of said plates having a recess or notch in the extended edge thereof, and also provided with a beveled portion extending from the junction of the top of said plate with the side edge of the scoop, and terminating in said notch or recess, a prong secured to each plate and projecting above the top of the scoop, a pair of handles for said scoop, each of which is movably mounted on one of said pivots and adapted to seat in one of said plate notches, a rod secured to one of said handles, a second rod secured to the remaining handle, and spring means between said rods normally holding said handles seated in said notches.

3. In a dirt scraper, a scoop having laterally projecting pivots at each side thereof, a bail movably mounted on said pivots, a pair of plates secured to the rear of said scoop and projecting laterally therefrom at opposite sides of said scoop, each of said plates having a recess or notch in the extended edge thereof, the lower portion of each plate forming the notch projecting beyond the corresponding portion at the upper side of said notch, said plates also provided with a beveled portion extending from the junction of the top of said plate with the side edge of the scoop and terminating at the top of said notch or recess, a prong secured to each plate and projecting above the top of said scoop, a pair of handles for said scoop, each of which is movably mounted on one of said pivots and adapted to seat in one of said plate notches, and spring controlled means normally drawing said handles together to maintain said handles seated in said notches, whereby said scoop and handles are movable together.

In testimony of which invention, I hereunto set my hand.

JAMES MacDOUGALL.

Witnesses:
R. M. KELLY,
E. W. SMITH.